(12) United States Patent
Gerroir et al.

(10) Patent No.: US 9,051,441 B2
(45) Date of Patent: Jun. 9, 2015

(54) PROCESS FOR CHEMICAL PASSIVATION OF POLYMER SURFACES

(75) Inventors: Paul J. Gerroir, Oakville (CA); Daryl W. Vanbesien, Burlington (CA); Peng Li, Edmonton (CA)

(73) Assignees: XEROX CORPORATION, Norwalk, CT (US); NATIONAL RESEARCH COUNCIL OF CANDA, Ottawa (CA)

( * ) Notice: Subject to any disclaimer, the term of this patent is extended or adjusted under 35 U.S.C. 154(b) by 295 days.

(21) Appl. No.: 13/433,980

(22) Filed: Mar. 29, 2012

(65) Prior Publication Data

US 2013/0260049 A1 Oct. 3, 2013

(51) Int. Cl.
*B05D 7/02* (2006.01)
*C08J 3/12* (2006.01)

(52) U.S. Cl.
CPC .............. *C08J 3/128* (2013.01); *C08L 2205/18* (2013.01)

(58) Field of Classification Search
CPC .................. C08J 7/04; C08J 7/06; C08J 3/00; B05D 7/02; B05D 7/18; B05D 7/24; C23C 14/34

USPC ........................................................ 427/212
See application file for complete search history.

(56) References Cited

U.S. PATENT DOCUMENTS

| | | | | |
|---|---|---|---|---|
| 3,629,025 A | * | 12/1971 | Walles | 156/69 |
| 4,780,390 A | * | 10/1988 | Hosoi | 430/110.2 |
| 5,194,356 A | * | 3/1993 | Sacripante et al. | 430/106.1 |
| 5,298,833 A | * | 3/1994 | Hou | 313/483 |
| 6,203,963 B1 | * | 3/2001 | Duff et al. | 430/137.11 |
| 6,821,698 B2 | * | 11/2004 | Sawada et al. | 430/108.4 |
| 2002/0055052 A1 | * | 5/2002 | Komoto et al. | 430/108.22 |

FOREIGN PATENT DOCUMENTS

| | | |
|---|---|---|
| CA | 2238865 A1 | 6/1997 |
| CA | 2452656 A1 | 1/2003 |

* cited by examiner

*Primary Examiner* — Elena T Lightfoot
(74) *Attorney, Agent, or Firm* — Pillsbury Winthrop Shaw Pittman LLP

(57) ABSTRACT

Process for passivating polymeric particles to prevent undesirable interaction with the environment. In particular, sputter coating of metal and surface treatment with aqueous solutions are shown to successfully passivate the particles, such as for example, toner particles, and prevent interaction between the particles and the epoxy embedding resin which causes artifacts, observed by transmission electron microscopy (TEM) imaging.

9 Claims, 2 Drawing Sheets

PROCESS FOR CHEMICAL PASSIVATION OF POLYMER SURFACES

BACKGROUND

The present embodiments relate to a novel process for passivating polymeric particles to prevent undesirable interaction with the environment. In specific embodiments, the passivation prevents the interaction between binder polymer resin in toner particles and the epoxy embedding resin which causes artifacts observed in transmission electron microscopy (TEM) imaging of the toner particles. However, the present embodiments are intended to be used to passivate any polymeric surface.

Development of high performance marking materials requires an understanding of the morphology and nanostructure of the various components within such materials, including colorants and specialty additives. For example, the microstructure of composite particles, as well as the location and distribution of the constituent materials within the binder polymer resin, affects their performance. Transmission electron microscopy is commonly used for accurately determining the primary particle dimensions, morphology and distribution of constituents that comprise the internal structure of marking materials such as toners. To obtain a "picture" depicting the internal composition of marking materials, which are typically smaller than 10 microns in diameter, requires that such particles be initially embedded in a curable resin and subsequently cut into thin slices for TEM analysis. Good candidates for an embedding resin must perform the following: (1) encapsulate but not permeate the particles, (2) cure at room temperature, and (3) be suitable for cross-sectioning and withstand electron beam irradiation without significant loss of mass.

Undesirable artifacts, however, can be seen in the TEM imaging process. For example, a possible artifact can, and often does, arise from an interaction between epoxy embedding resin and polyester particles that are being analyzed. The specific interaction investigated is thought to occur between the epoxy and crystalline polyester present in the particles. This interaction was altering the nature of the crystalline polyester in the toner particles being studied and would often lead to incorrect interpretations of toner morphology. Several embedding resins have been tested but epoxy has been the only one to work satisfactorily as an embedding resin. As such, passivation of the surface of the particles is required to obtain accurate images when embedding the particles in epoxy resin.

Thus, there is a need to devise a technique for passivating polymeric surfaces, such as for example, those of the particles, when it is necessary to render those surfaces such that they will not undergo any undesirable interactions with the environment. In specific situations, there is a need to devise such techniques to passivate polymeric particles to facilitate the embedding of particles, such as toner particles, containing crystalline polyester into epoxy resin while preventing unwanted artifacts.

SUMMARY

According to the embodiments illustrated herein, there is provided a process for passivating a polymeric material, comprising: surface treating the polymeric material, wherein the polymeric material does not interact with the environment.

In embodiments, the surface treatment further comprises sputter coating the polymeric material with one or more metals to form a thin layer of metal over the surface of the polymeric material. In other embodiments, the surface treatment further comprises immersing the polymeric material an aqueous solution, for example, one comprising ruthenium tetroxide or osmium tetroxide, then washing and drying the polymeric material.

In particular, the present embodiments provide a process for passivating a polymeric particle, comprising: surface treating the polymeric particle; and embedding the surface treated polymeric particle in a resin, wherein the polymeric particle is passivated.

In further embodiments, there is provided a process for embedding a polymeric particle in an embedding resin, comprising: surface treating the polymeric particle; and embedding the surface treated polymeric particle in a resin, wherein the polymeric particle does not interact with the embedding resin.

BRIEF DESCRIPTION OF THE DRAWINGS

For a better understanding of the present embodiments, reference may be had to the accompanying figure.

DETAILED DESCRIPTION

Figure 1:
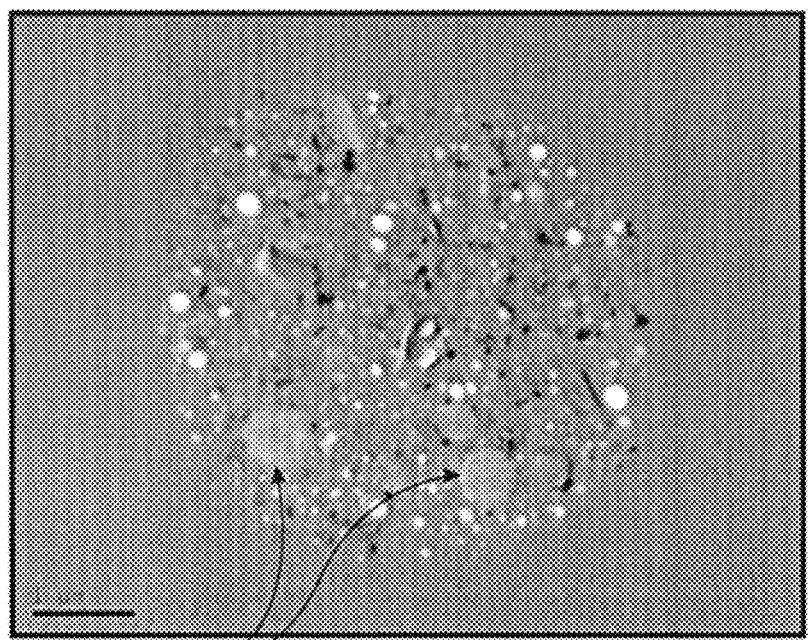
FIG. 1 is a TEM micrograph illustrating a cross-section of a polyester composite particle comprising crystalline polyethylene wax.

In the following description, it is understood that other embodiments may be utilized and structural and operational changes may be made without departure from the scope of the present embodiments disclosed herein.

The present embodiments relate to processes for passivating the surface of a polymer to prevent undesirable chemical attack. In particular, the present embodiments are directed to the use of metal oxides or sputter coating of platinum/palladium to passivate the surface of toner particles to prevent an embedding resin, such as epoxy, from interacting with the toner particles and forming undesirable artifacts, observed during transmission electron microscopy (TEM) analysis. Without the passivation, the epoxy causes partial dissolution of the polymer binder in the toner and its subsequent re-crystallization which leads to misinterpretation of the morphology of toner particles from the TEM images.

As part of morphological studies, polyester toner particles must first be encapsulated in an epoxy resin to facilitate cross-sectioning. Recently, it was discovered that an interaction between the epoxy embedding media and crystalline polyester in the particles was occurring and resulting in undesirable artifacts. This chemical reaction was altering the nature of the crystalline polyester in the particles being studied and would consequently lead to incorrect interpretations of the morphology. Several embedding resins were tested for replacement of epoxy, but no other resin was found to work satisfactorily. Therefore, passivation of the surface of the particles is required when embedding the particles in epoxy resin to prevent the unwanted artifacts. In fact, passivation of the surface of particles, in general, to prevent unwanted interaction with any embedding resin would be very useful.

The present inventors discovered a technique to successfully passivate the surface of particles by surface coating the particles with heavy metals. The present embodiments may be used to embed a polymeric material selected from the group consisting of a polyester, polyethylene, polypropylene, polystyrene, poly(butylacrylate), butadiene, polyisoprene, poly(methylmethacrylate), natural rubber, polyacrylate, poly(vinyl chloride), polyamides, ureas, urethanes, phenolics, poly(ethylene terephthalate), acrylonitrile, polycarbonates and mixtures thereof. The present embodiments help passivate the particles such that undesirable interaction with the particle environment is facilitated. In embodiments, the particles that are treated will not interact with a number of resins that may come in contact with the surface of the particles or that may be used to embed the particles. For example, the resins that may be used with the present embodiments include epoxies or polyepoxides and epoxides, methacrylates and glycol methacrylates, melamines, any acrylic resin derived from acrylic acid, methacrylic acid or other related compounds, and mixtures thereof. The embodiments also include specific commercial resins which include "Spurr" Low Viscosity Kit, available from Ted Pella, Inc. (Redding, Calif.), which comprises ERL 4221 (vinylcyclohexene dioxide), DER 736 (diglycidyl ether of propylene glycol), NSA (nonenyl succinic anhydride) and DMAE (dimethylaminoethanol); Araldite 502 Kit, available from Ted Pella, Inc. which comprises Araldite 502 a diglycidyl ether of bisphenol-A (4,4' isopropylidenediphenol), DDSA (dodecenyl succinic anhydride) and BDMA (benzyl dimethylamine) or DMP-30 (2,4,6-tris(dimethylaminomethyl) phenol); Araldite 6005 Kit, available from Electron Microscopy Sciences (Hatfield, Pa.), which comprises Araldite 6005, DDSA, BDMA and DBP (dibutyl phthalate); Eponate 12™ Kit, available from Ted Pella, Inc., which comprises Eponate 12™ an aliphatic epoxy resin based on di- and tri-glycidyl ethers of glycerol, DDSA, NMA (Nadic Methyl Anhydride) and BDMA or DMP-30 or Araldite 502; Glycol Methacrylate (GMA) Kit, available from Ted Pella, Inc., which comprises GMA, n-Butyl Methacrylate and Benzoyl Peroxide; JB-4® and JB-4 Plus® Kits, available from Ted Pella, Inc., which are based upon the GMA embedding resin; Lowicryl Kits, available from SPI Supplies, which are acrylate-methacrylate mixtures; Poly-Bed®-812 Kit, available from Ted Pella, Inc., which comprises Poly-Bed 812®, DDSA, NMA and BDMA; LR Gold Resin Kit, available from Ted Pella, Inc., which comprises LR Gold, a polyhydroxy-substituted bisphenol A dimethacrylate with C12 methacrylate ester and accelerator N,N-dimethylparatoluidine, PVP (polyvinylpyrolidone), BPO Benzoyl Peroxide and Benzil; LR White Resin Kit, available from Ted Pella, Inc., which comprises LR White a polar, monomer polyhydroxylated aromatic acrylic resin and BPO (the accelerator N,N-dimethylparatoluidine is optional); Nanoplast™ FB101 Kit, available from SPI Supplies (West Chester, Pa.), which comprises Nanoplast (melamine/formaldehyde resin) and catalyst B52; Unicryl™ Kit, available from Ted Pella, Inc., which comprises Unicryl™ resin, a styrene monomer, methyl methacrylate and BPO; Durcupan® Kit, available from SPI Supplies, which comprises Durcupan A resin, an aliphatic polyepoxide, DDSA, DMP-30 and DBP; Durcupan® ACM Kit, available from SPI Supplies, which comprises Durcupan NM resin, an aromatic polyepoxide, DDSA, DMP-30 and DBP; Maraglas 655 Kit, available from SPI Supplies, which comprises Maraglas 655 resin, Cardolite NC-513, DBP and BDMA; Maraglas 732 Kit, available from SPI Supplies, which comprises Maraglas 655 resin, D.E.R.™ 732, DBP and BDMA; Quetol 651-NSA Kit, available from SPI Supplies, which comprises Quetol 651 (Ethylene Glycol Diglycidyl Ether), NMA, NSA and DMP-30; and Epo-Fix Kit, available from Electron Microscopy Sciences, which comprises Bisphenol-A-Diglycidylether resin and Triethylenetetramine hardener.

In a specific embodiment, particles containing crystalline polyester were successfully surface-treated with an aqueous solution of $RuO_4$ or $OsO_4$. The solution may also, in other embodiments, comprise phosphotungstic acid, bromine, iodine, chlorosulfonic acid, silver sulfide, mercuric trifluoroacetate, tin chloride, uranyl acetate, lead acetate, lead citrate, lead nitrate, silver iodide and silver nitrate and mixtures thereof. The particles were then embedded into epoxy without creating unwanted artifacts. In embodiments, the aqueous solution may comprise $RuO_4$ in an amount of from about 0.1 percent to about 2.0 percent, or from about 0.2 percent to about 1.0 percent, or from about 0.4 percent to about 0.6 percent by weight of a total weight of the solution. In embodiments, the aqueous solution may comprise $OsO_4$ in an amount of from about 1.0 percent to about 10.0 percent, or from about 2.0 percent to about 8.0 percent, or from about 3.0 percent to about 5.0 percent by weight of a total weight of the solution. In embodiments, the particles are treated by immersion in the solution for about 10 minutes to about 4 hours, or from about 15 minutes to about 3 hours, or from about 30 minutes to about 2 hours. The treated particles are rinsed then dried for about 30 minutes to about 24 hours, or from about 1 hour to about 16 hours, or from about 2 hours to about 12 hours at a temperature of from about 16° C. to about 30° C., or from about 18° C. to about 28° C., or from about 20° C. to about 25° C.

Particles were also successfully passivated by sputter coating with Platinum/Palladium alloy. In other embodiments, the coating comprises one or more metals selected from the group consisting of palladium, platinum, gold, silver, chromium, tantalum, tungsten, aluminum, nickel, cobalt, copper, iridium, iron, molybdenum, titanium and mixtures thereof. In other embodiments, the coating may comprise a ceramic material instead of metallic material. The coating material may comprise a weight ratio of Platinum/Palladium of from about 90:10 to about 50:50, or of from about 85:15 to about 55:45, or of from about 80:20 to about 60:40. The coating may further comprise boron, iron, gold, silicon, silver, magnesium, iridium, lead, rhodium, copper and aluminum. In embodiments, atoms of the coating material are ejected in an inert gas, under vacuum of from about 0.01 to about 0.06 mbar, or from about 0.02 to about 0.05 mbar, or from about 0.03 to about 0.04 mbar. The sputtering may be performed for about 10 to about 600 seconds, or from about 20 to about 480 seconds, or from about 30 to about 300 seconds at a current of about 20 mA to about 80 mA. In embodiments, the particle is sputter coated with a layer of the Platinum/Palladium having a thickness of from about 0.5 to about 20 nm, or from about 1 to about 10 nm, or from about 2 to about 8 nm.

The sputter coating process was found to be successful in passivating only the side of the particle exposed to the metal flux. However, this method would be well-suited for flat surfaces. The aqueous approach works well for particle passivation prior to embedding crystalline polyester containing particles in epoxy for purposes of microscopy analysis. As such, the present embodiments provide processes that comprise both the sputter coating and aqueous surface treatment techniques. In specific embodiments, there is provided a process for passivating the surface of particles, such as toner particles, by coating with Platinum/Palladium or with an aqueous solution of either $RuO_4$ or $OsO_4$ and mixtures thereof. Particles containing crystalline polyester were shown to be successfully surface treated with the present embodiments and could then be embedded into epoxy without any unwanted artifacts from the interaction of the polyester polymer and epoxy resin. Experimental data has provided compelling TEM images of particles with and without the passivation treatment. Thus, the present embodiments provide processes for passivating polymeric materials. Benefits of the present embodiments include simplicity of procedure as well as successful prevention of undesirable interactions between a polymeric material and its environment.

Particles or polymeric surfaces could also be passivated by the thermal evaporation of metals such as: gold, silver, platinum and aluminum to name a few. Thermal evaporation is conducted in a vacuum and involves two processes: 1) the evaporation of a heated source metal, such as those listed above and 2) condensation onto a substrate, e.g., polymeric surface.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Materials

The marking materials used in the study comprised of an amorphous polyester matrix within which were dispersed one or more crystalline phases. Also included in the formulation was a colorant.

The initial step in sample preparation was to embed the polyester particles in an epoxy resin. The embedding media was a two-component epoxy consisting of a highly viscous, unmodified resin based on Bisphenol A, known as ARALDITE GY6020 (available from Huntsman Advanced Materials (The Woodlands, Tex.)) and the hardener, tetraethylene pentamine (available from Sigma-Aldrich Corp. (St. Louis, Miss.)) mixed in a ratio of about 12:1 respectively.

Cross-sections were prepared using a Leica EM UC6 Ultracut ultramicrotome (available from Leica Microsystems Inc. (Buffalo Grove, Ill.)) with a Diatome ultrasonic knife (available from Diatome AG (Biel, Switzerland)). Microscopy was completed using a Philips/FEI CM20 (available from FEI Company (Hillsboro, Ore.)) and JEOL 2200FS Transmission Electron Microscopes (available from JEOL Ltd. (Tokyo, Japan)).

Stains used were: 4 percent and 0.5 percent aqueous solutions of osmium and ruthenium tetroxide, respectively. Sputter coating where required was completed with a Cressington coater, model 208HR (available from Cressington Scientific Instruments Ltd. (Watford, UK))

Examination of Interaction Between Embedding Resin and Polyester Particles

Figure 2:
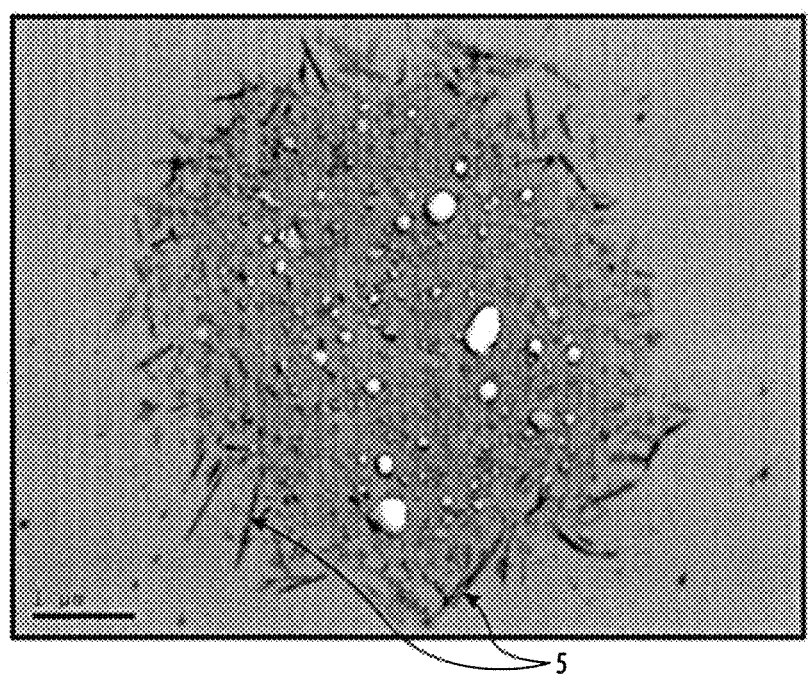
FIG. 2 is a TEM micrograph illustrating a cross-section of a polyester composite particle comprising crystalline polyester.

Initially, two preparations of polyester particles were made, each with one of two different crystalline components present. The polyester composite particles were embedded in epoxy resin and after curing, cross-sections of the particles were cut and collected on 400-mesh copper grids. For one sample, containing a crystalline polyethylene wax, the domains 1 appeared intact and unchanged through TEM analysis (FIG. 1). The other polyester composite particle, which included a crystalline polyester, was found to have needle-like domains 5 occurring near the surface of the particles through TEM analysis (FIG. 2).

The presence of these features at the particle surface could not be seen by scanning electron microscopy. These results strongly suggest that the epoxy resin used interacts with the crystalline polyester component present in the particles such that near-surface domains are altered. Alternate embedding materials were tried without success.

Preparation of Passivated Particles

Two approaches were used to passivate the polyester particles prior to embedding in epoxy resin to inhibit/prevent interaction with the crystalline polyester: (1) sputter coating the particles with a Platinum/Palladium thin film, and (2) treating particles in an aqueous solution of ruthenium tetroxide or osmium tetroxide.

Sputter Coating

Sputter coating was performed as follows: a) toner particles were lightly dusted onto a glass slide, b) the glass slide was affixed to a sample holder in the chamber of the Cressington 208HR sputter coater, c) power to the sputter coater and the MTM-20 quartz crystal thickness monitor was switched on, d) the chamber was evacuated of air and 'flushed' 3 times with the inert gas argon, e) when the vacuum had reached about 0.02-0.04 mbar, the sample holder with attached glass slide was started spinning, f) pressed Start/Stop button, g) when thickness monitor reads about 4 nm pressed the Start/Stop button, h) turned off power to the thickness monitor, sputter coater and sample rotation control, i) after chamber reached atmospheric pressure, chamber opened and glass slide with treated toner particles removed, j) treated toner particles mixed with epoxy resin and deposited into a conical BEEM capsule. Once the epoxy resin was fully cured the sample is ready for sectioning.

Aqueous Treatment

The treatment with the aqueous solution was performed as follows: a) a small quantity (about 0.02 g) of toner was deposited into a 5 mL vial, b) to the vial 2 mL of deionized water added and stirred for approximately 15 minutes, c) 2 mL of 0.5% aqueous ruthenium tetroxide added with continued stirring for additional 30 minutes, d) slurry of treated particles deposited into 50 mL of deionized water then filtered through a 1 micron Nuclepore (Whatman) filter, e) approximately 250 mL of deionized water used to thoroughly rinse toner particles, f) toner particles allowed to dry at room temperature in a fume hood, g) treated toner particles mixed with epoxy resin and deposited into a conical BEEM capsule. Once the epoxy resin was fully cured the sample is ready for sectioning.

Figure 3:
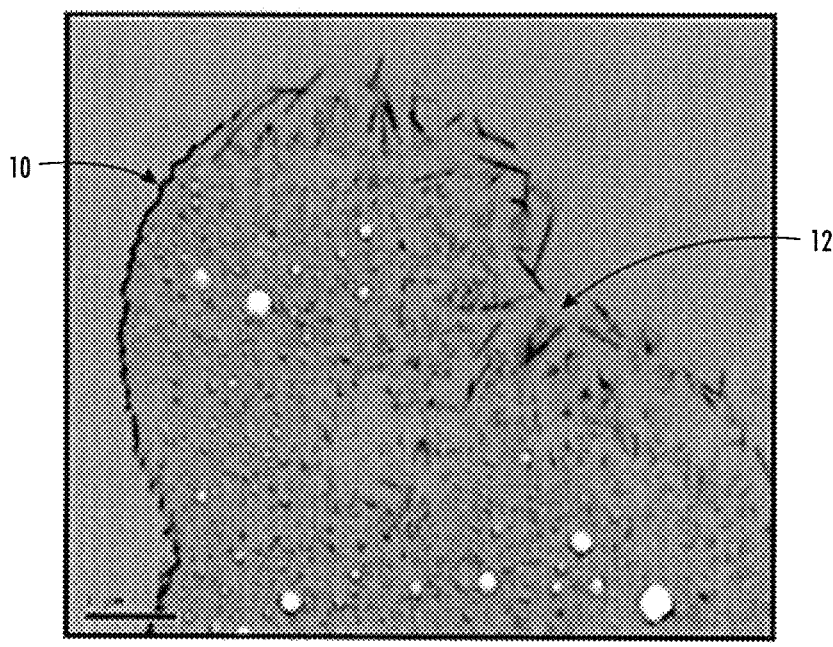
FIG. 3 is a bright field transmission electron microscope image of a cross-section of a polyester particle that was pretreated prior to embedding in epoxy by sputter coating with a Platinum/Palladium thin film.
Figure 4:
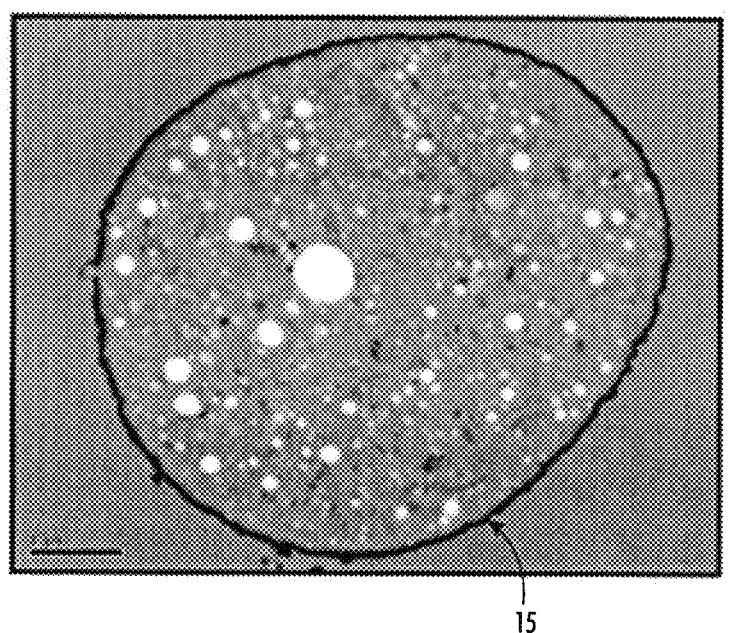
FIG. 4 is a bright field transmission electron microscope image of a cross-section of a polyester particle that was pretreated prior to embedding in epoxy by stirring in an aqueous solution of ruthenium tetroxide.

Both approaches were demonstrated to be effective in the surface passivation of polyester particles. However, while sputter coating provided protection only to those surface areas receiving a thin film of Platinum/Palladium, solution treatment using $RuO_4$ or $OsO_4$ created a barrier surrounding the particles and thus provided protection from an interaction with epoxy resin for the entire particle. Cross-sections of the treated particles were examined by transmission electron microscopy. FIG. 3 and FIG. 4 illustrates the protective effect offered by both treatment processes. In FIG. 3, a sputter coating of Platinum/Palladium was provided while in FIG. 4, a surface treatment with an aqueous solution of $RuO_4$ was applied. As seen from these figures, the integrity of the particle is only partially protected 10 by the sputtered film while the uncoated region 12 exhibits needle-like artifacts arising from the epoxy-sample interaction. It is hypothesized that the epoxy embedding material partially dissolves the crystalline polyester which, over the cure time of the epoxy, slowly re-crystallizes forming needle-like features. Treating the polyester particles by dispersing in and mixing with an aqueous solution of ruthenium or osmium tetroxide results in the full protection or passivation of the entire surface 15, as shown in FIG. 4. Even though the sputter coating of particles using Platinum/Palladium was only partially successful with particles, the process would nonetheless work well on flat surfaces that require passivation.

SUMMARY

The present embodiments provide processes for passivating polymeric materials to render the surface of such materials so that they do not interact with the environment. In a specific example, the interaction between epoxy embedding resins and certain polymeric materials, which can result in imaging artifacts, was shown to be prevented by the present processes. To remedy these problems, the present embodiments provide processes for passivating the surface of the particles prior to embedding in epoxy resin to prevent any unwanted interaction between the particles and the epoxy. In the present embodiments, protection of the polymer particles is performed by using a thin metal layer applied by either physical sputtering on the particles or (wet) chemical methods to encapsulate the particles.

According to the embodiments illustrated herein, there is provided a novel process for passivating the surfaces of polymeric materials. In particular, the present embodiments provide a means to passivate the surface of polyester toner particles thus preventing any chemical interaction between an embedding resin and the components of the composite particle under study. In further embodiments, there is provided a methodology to passivate any polymeric surface preventing undesirable interaction with its environment.

While the processes were used in a particular embodiment to treat toner particles prior to TEM analysis, the present processes described can be used for a broad range of polymeric materials in a diverse range of scientific and industrial applications.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A process for passivating a polymeric material, comprising:
    (a) surface treating the polymeric material, wherein the polymeric material constitutes the surface of one or more toner particles, the one or more toner particles comprising a crystalline polyester; and wherein the surface treatment comprises
        (i) immersing the polymeric material into an aqueous solution of either ruthenium tetroxide or osmium tetroxide,
        (ii) rinsing the polymeric material, and
        (iii) drying the polymeric material, thereby providing a passivated polymeric material.

2. The process of claim 1, wherein the aqueous solution comprises the ruthenium tetroxide or osmium tetroxide in an amount of from about 0.1 percent to about 10.0 percent by weight of a total weight of the solution.

3. The process of claim 1, wherein the polymeric material is immersed in the aqueous solution for about 10 minutes to about 4 hours.

4. The process of claim 1, wherein the polymeric material is dried for about 30 minutes to about 24 hours.

5. The process of claim 1, wherein the polymeric material is dried at a temperature of from about 16° C. to about 30° C.

6. A process for passivating one or more toner particles, comprising:
    (a) surface treating one or more toner particles, wherein the one or more toner particles comprise crystalline polyester and wherein the surface treatment comprises
        (i) immersing the one or more toner particles into an aqueous solution of osmium tetroxide,
        (ii) rinsing the one or more toner particles, and
        (iii) drying the one or more toner particles, thereby providing one or more passivated toner particles; and
    (b) embedding the one or more passivated toner particles in an embedding resin.

7. The process of claim 6, wherein the embedding resin comprises an epoxy resin.

8. A process for embedding one or more toner particles in an embedding resin, comprising:
    (a) surface treating one or more toner particles, wherein the one or more toner particles comprise crystalline polyester and wherein the surface treatment comprises
        (i) immersing the one or more toner particles into an aqueous solution of either ruthenium tetroxide or osmium tetroxide,
        (ii) rinsing the one or more toner particles, and
        (iii) drying the one or more toner particles, thereby providing one or more passivated toner particles; and
    (b) embedding the one or more passivated toner particles in the embedding resin.

9. The process of claim 6, wherein the embedding resin is a two-component epoxy consisting of a Bisphenol A-based resin and tetraethylene pentamine.

\* \* \* \* \*